(12) United States Patent
Lo et al.

(10) Patent No.: US 11,863,696 B2
(45) Date of Patent: Jan. 2, 2024

(54) COMMUNICATIONS HANDSET CRADLE ATTACHMENT

(71) Applicant: Avaya Management L.P., Durham, NC (US)

(72) Inventors: Philip Lo, Ontario (CA); James Erskine, Ontario (CA)

(73) Assignee: Avaya Management L.P., Morristown, NJ (US)

( * ) Notice: Subject to any disclaimer, the term of this patent is extended or adjusted under 35 U.S.C. 154(b) by 240 days.

(21) Appl. No.: 17/504,990

(22) Filed: Oct. 19, 2021

(65) Prior Publication Data
US 2023/0119692 A1 Apr. 20, 2023

(51) Int. Cl.
*H04M 1/06* (2006.01)

(52) U.S. Cl.
CPC ..................... *H04M 1/06* (2013.01)

(58) Field of Classification Search
CPC .................. H04M 1/04; H04M 1/06
See application file for complete search history.

(56) References Cited

U.S. PATENT DOCUMENTS

| 4,250,356 A | * | 2/1981 | Hammer, Jr. | H04M 1/11 379/450 |
| 2011/0216898 A1 | * | 9/2011 | Huang | H04M 1/05 379/428.02 |

* cited by examiner

*Primary Examiner* — Tuan D Nguyen

(57) ABSTRACT

The technology disclosed herein attaches to a communications handset cradle to improve accessibility. In a particular embodiment, an apparatus includes a connector for affixing the apparatus to a telephone handset cradle. The apparatus also includes a bottom face with a first sidewall and a second sidewall extending from the bottom face. A distance between the first sidewall and the second sidewall tapers towards the cradle.

20 Claims, 10 Drawing Sheets

COMMUNICATIONS HANDSET CRADLE ATTACHMENT

TECHNICAL BACKGROUND

The seemingly trivial task of placing a telephone handset into its cradle can be difficult for many people with disabilities. Typical handset cradle designs offer snug fits, mainly for cosmetics/industrial design intent. As such, it may be difficult place the handset back in its cradle (e.g., to hang up a phone call).

SUMMARY

The technology disclosed herein attaches to a communications handset cradle to improve accessibility. In a particular embodiment, an apparatus includes a connector for affixing the apparatus to a telephone handset cradle. The apparatus also includes a bottom face with a first sidewall and a second sidewall extending from the bottom face. A distance between the first sidewall and the second sidewall tapers towards the cradle.

In some examples, a height of the first sidewall and the second sidewall from the bottom face tapers towards the cradle.

In some examples, the bottom face abuts an opening to the telephone handset cradle.

In some examples, the bottom face gradually changes shape from substantially flat to match a shape of an opening to the telephone handset cradle.

In some examples, the connector comprises a screw hole through which a screw attaches the apparatus to a telephone that includes the telephone handset cradle.

In some examples, the telephone includes a preexisting hole into which the screw is positioned.

In some examples, the connector comprises a clip formed by the first sidewall and the second sidewall.

In some examples, the connector comprises a surface abutting a telephone that includes the telephone handset cradle. Adhesive applied to the surface affixes the surface to the telephone.

In some examples, the apparatus includes a protrusion that fits into a portion of a telephone that includes the telephone handset cradle to maintain proper orientation of the apparatus relative to the telephone handset cradle. The connector may include the protrusion in some cases.

In another example, a method is provided that includes affixing an apparatus to a telephone that includes a telephone handset cradle. The apparatus includes a connector for affixing the apparatus to a telephone handset cradle and a bottom face. The apparatus also includes a first sidewall and a second sidewall extending from the bottom face. A distance between the first sidewall and the second sidewall tapers towards the cradle.

DETAILED DESCRIPTION

The attachment apparatus described herein improves the accessibility of using a telephone handset and a cradle in which the handset rests when not in use (commonly referred to as the on-hook position for the handset). In particular, once affixed to a telephone device in proper alignment with the cradle, the apparatus increases the target area for a user to contact with a handset when attempting to place the handset into the cradle. Sidewalls of the apparatus guide the handset into the cradle. Having a larger target for placing a handset in its cradle is beneficial for all users but may be especially beneficial to users with impaired motor functions, impaired eyesight, or other types of disabilities that make it difficult for them to otherwise place the handset.

Figure 1:
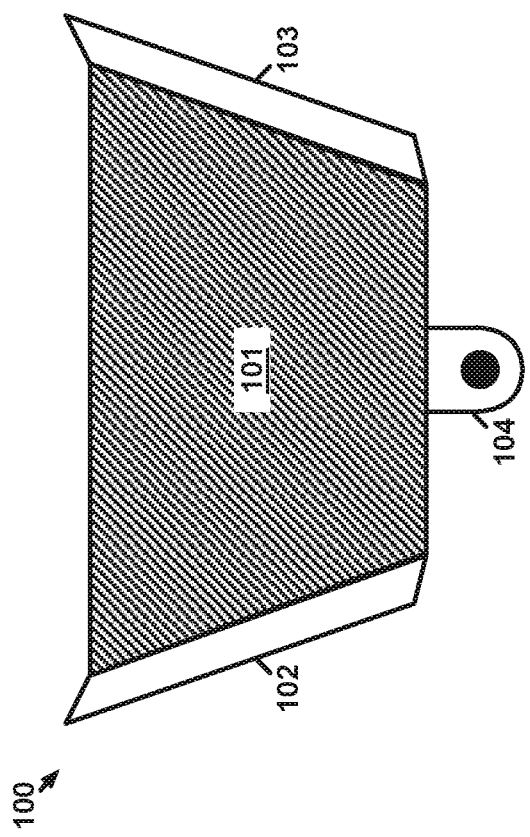
FIG. 1 illustrates a handset cradle attachment from a top down perspective.

FIG. 1 illustrates handset cradle attachment 100 from a top down perspective. Handset cradle attachment 100 includes bottom face 101, sidewall 102, sidewall 103, and connector 104. Handset cradle attachment 100 may be manufactured out of metal, plastic, resin, or some other type of material that results in a structure rigid enough to perform as described herein—including combinations thereof. Handset cradle attachment 100 may be manufactured using casting, injection molding, three-dimensional (3D) printing, or some other type of manufacturing process—including combinations thereof. Handset cradle attachment 100 may be manufactured as one single piece of material or different portions of handset cradle attachment 100 may be manufactured separately before being combined.

Bottom face 101 is substantially flat in this example but the shape may be formed to better match with the shape of a handset cradle to ensure a smooth transition from handset cradle attachment 100 to the handset cradle when a handset is being placed therein. In one example, the portion of bottom face 101 that is farther away from the handset cradle may be substantially flat and that shape changes to match up with the shape of the cradle at the end of bottom face 101 that abuts the cradle. Sidewalls 102 and 103 may be perpendicular to bottom face 101 or may be positioned at an angle greater than 90 degrees relative to bottom face 101. Sidewalls 102 and 103 are further apart from one another at the end of bottom face 101 away from the cradle that distance tapers as sidewalls 102 and 103 get closer to the cradle. The tapering of the distance between sidewalls 102 and 103 enables handset cradle attachment 100 to funnel a telephone handset in towards the cradle. While sidewalls 102 and 103 are illustrated as being straight, sidewalls 102 and 103 may taper in other ways (e.g., may curve inward towards one another).

Connector 104 is merely one example of how handset cradle attachment 100 may attach to a telephone. In this case, connector 104 is shown as a tab protruding from under bottom face 101. A hole exists in connector 104 through which a fastener, like a screw, may be placed to secure connector 104 and, therefore, handset cradle attachment 100 to a telephone. In other examples, connector 104 may include multiple tabs, or may be wider (e.g., up to the wide of bottom face 101), which may accommodate multiple holes for attaching to a telephone. In other examples, connector 104 may be a surface of handset cradle attachment 100 that contacts a surface of the telephone such that adhesive applied to the surface affixes handset cradle attachment 100 to the telephone. In some examples, connector 104 may be a component of handset cradle attachment 100 that is shaped in such a way to mate with a receiving portion on the telephone to clip handset cradle attachment 100 to the telephone. For instance, sidewalls 102 and 103 may include protrusions, such as tabs, that are shaped in such a way to clip into indents on the telephone or clip over an existing surface of the telephone. Those sidewall extensions would be connector 104 in that instance. Many other types of connector mechanisms may be used in other examples, including combinations of multiple connector mechanisms.

It should be understood that, while the examples herring refer to telephones and telephone handsets, the telephones and telephone handsets may be used for communications other than those over a telephone network. For example, similar apparatuses may be used for intercom or announcement systems that do not transmit or receive communications over a telephony network.

Figure 2:
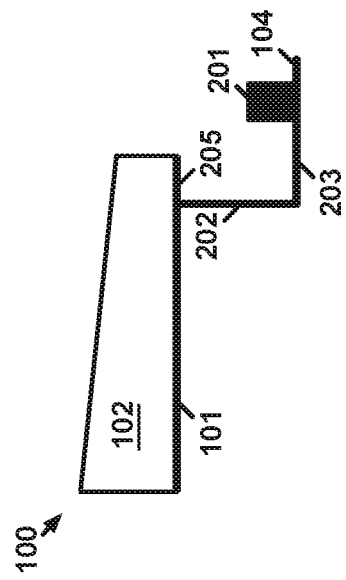
FIG. 2 illustrates a handset cradle attachment from a profile perspective.

FIG. 2 illustrates handset cradle attachment 100 from a profile perspective. Specifically, handset cradle attachment 100 is viewed from the side facing sidewall 102, which obscures sidewall 103 from view. In this example, rather than being a uniform height relative to bottom face 101 across its entire length, the height of sidewall 102 (and sidewall 103 though not shown) tapers down in the direction of where handset cradle attachment 100 will be attached to a telephone cradle (i.e., towards connector 104). Thus, at the widest portion of bottom face 101, sidewalls 102 and 103 are at their highest to provide a larger well in which a telephone handset can be captured.

In this example, connector 104 includes perpendicular face 202, parallel face 203, and protrusion 201. Perpendicular face 202 may be as wide as bottom face 101 or may be narrower as long as it is wide enough to support parallel face 203. While faces 202 and 203 are shown perpendicular and parallel to bottom face 101, it should be understood that other angles may be used, which may be dependent upon the type of telephone to which handset cradle attachment 100 is to attach. Similarly, the lengths of faces 202 and 203 may be dependent upon the type of telephone (e.g., dimensions) to which handset cradle attachment 100 is to attach. In this example, the hole in connector 104 is also a hole through protrusion 201. Protrusion 201 may be positioned such that it fits into an existing hole in the telephone to which handset cradle attachment 100 is to attach. If there was hole in protrusion 201, then protrusion 201 itself may be used to clip handset cradle attachment 100 onto the telephone. In this case, since there is a hole in protrusion 201, the corresponding hole in the telephone may be a well in which a screw holding the telephone is already positioned. The screw may then be removed, protrusion 201 may be positioned into the hole, and then the screw may be replaced through protrusion 201 to affix handset cradle attachment 100 to the telephone.

In some examples, protrusion 201, and the hole through parallel face 203, may not exist. Instead, adhesive may be applied to one or more of faces 202 and 203 to affix handset cradle attachment 100 to the telephone. Parallel face 203 may not be necessary in some examples where adhesive is applied to perpendicular face 202 for affixation to the telephone. Similarly, perpendicular face 202 may not be necessary in some examples where adhesive is applied to surface 205, which is a portion of the underside of bottom face 101 that will make contact with the telephone. Surface 205 may, therefore, be considered connector 104 in those examples. Additionally, while a screw hole is discussed passing through parallel face 203 above, one or more screw holes and/or protrusions like protrusion 201 may be located on perpendicular face 202 and/or surface 205 instead or as well, depending on which faces are included on handset cradle attachment 100.

Many different examples have been discussed for connector 104 above. It should be understood that connector 104 is merely a mechanism for attaching bottom face 101 and sidewalls 102 and 103 to a telephone in a position that is conducive to guiding a handset for the telephone into the telephone's handset cradle. Connector 104 may, therefore, look very different from what is illustrated.

Figure 3:
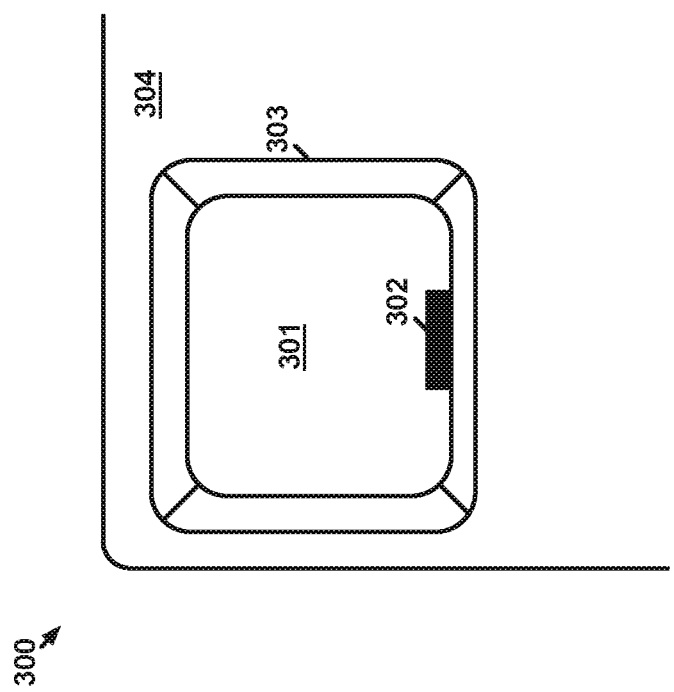
FIG. 3 illustrates a handset cradle portion of a telephone.

FIG. 3 illustrates a handset cradle portion of a telephone 300. Telephone 300 includes handset cradle 301, hook 302, cradle sidewalls 303, and telephone surface 304. Though not shown, telephone 300 may further include a dial pad, display screen, speaker, function buttons, and/or some other type of feature. In some examples, handset cradle 301 may include a button that depresses when a handset is placed therein to signal to telephone 300 that the handset in on hook. Handset cradle 301 is a well of telephone surface 304 in which the earpiece portion of a telephone handsets rests when the handset is on-hook. Cradle sidewalls 303 create the well of handset cradle 301 and hook 302 is in handset cradle 301. Hook 302 fits into a corresponding impression on the handset to hold the handset in handset cradle 301. Typically, telephone surface 304 is at a slant (or even vertical), so hook 302 prevents the handset from sliding downward and out of handset cradle 301.

Handset cradle 301 is merely an example handset cradle because handset cradles come in many shapes and sizes. For instance, in this example, handset cradle 301 has cradle sidewalls 303 completely surrounding its well, which may not be the case in all examples.

Figure 4:
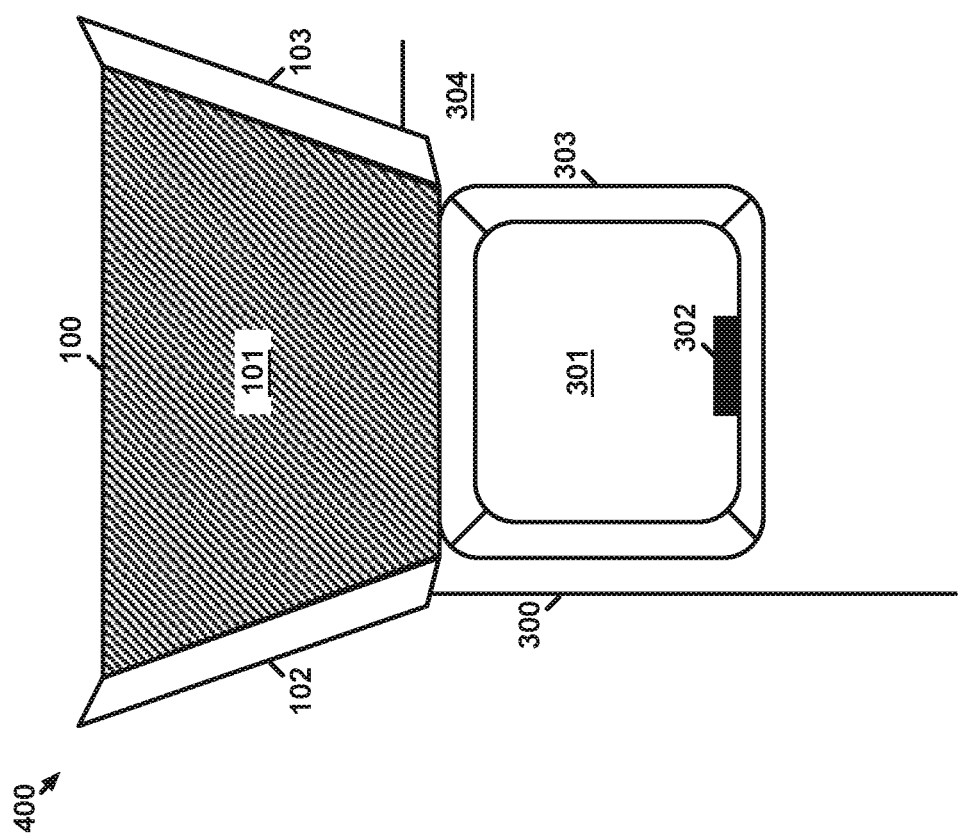
FIG. 4 illustrates a combined apparatus of a handset cradle attachment affixed to a telephone from a top down perspective.

FIG. 4 illustrates a combined apparatus 400 of handset cradle attachment 100 affixed to the telephone from a top down perspective. Combined apparatus 400 is an example of how handset cradle attachment 100, when properly positioned to abut handset cradle 301, is able to guide a telephone handset (or at least the earpiece thereof) into handset cradle 301. By abutting handset cradle 301 in this way, handset cradle attachment 100 is not too close to handset cradle 301 so as to prevent the telephone handset from fitting into handset cradle 301. Handset cradle attachment 100 is also not too far away from handset cradle 301 such that sidewalls 102 and 103 can guide the telephone handset all the way to the edge of handset cradle 301. In some examples, even if bottom face 101 cannot extend further (e.g., so that bottom face 101 does not block a portion of handset cradle 301), sidewalls 102 and 103 may extend parallel to one another along the rim of handset cradle 301 to guide the handset beyond bottom face 101.

Figure 5:
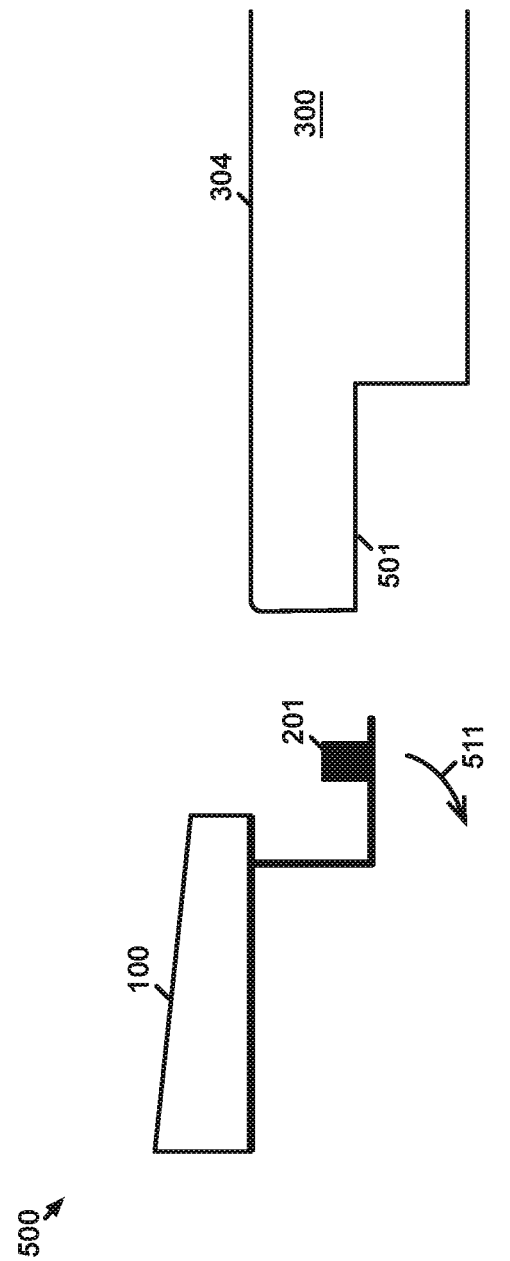
FIG. 5 illustrates a handset cradle and a telephone attachment from a profile perspective prior to attachment.

FIG. 5 illustrates pre-attachment apparatus 500 including handset cradle attachment 100 and telephone 300 from a profile perspective prior to attachment. Though it cannot be seen from the profile perspective, telephone 300 includes screw hole 501 into which protrusion 201 fits when handset cradle attachment 100 is affixed to telephone 300. For protrusion 201 to reach screw hole 501, since protrusion 201 is blocked by the body of telephone 300, perpendicular face 202 and/or parallel face 203 of connector 104 may flex relative to bottom face 101 in the general direction of arrow 511. Connector 104 flexes enough so as to allow protrusion 201 to not be impeded by the body of telephone 300. While connector 104 is flexed, handset cradle attachment 100 may be positioned such that protrusion 201 fits into screw hole 501 when returning connector 104 returns (i.e., unflexes) to its original shape. While the flexing of connector 104 may imply that at least a portion of connector 104 is made out of an elastic material, connector 104 may use other characteristics, such as a spring loaded hinge, that enable protrusion 201 to flex in the direction of arrow 511.

Figure 6:
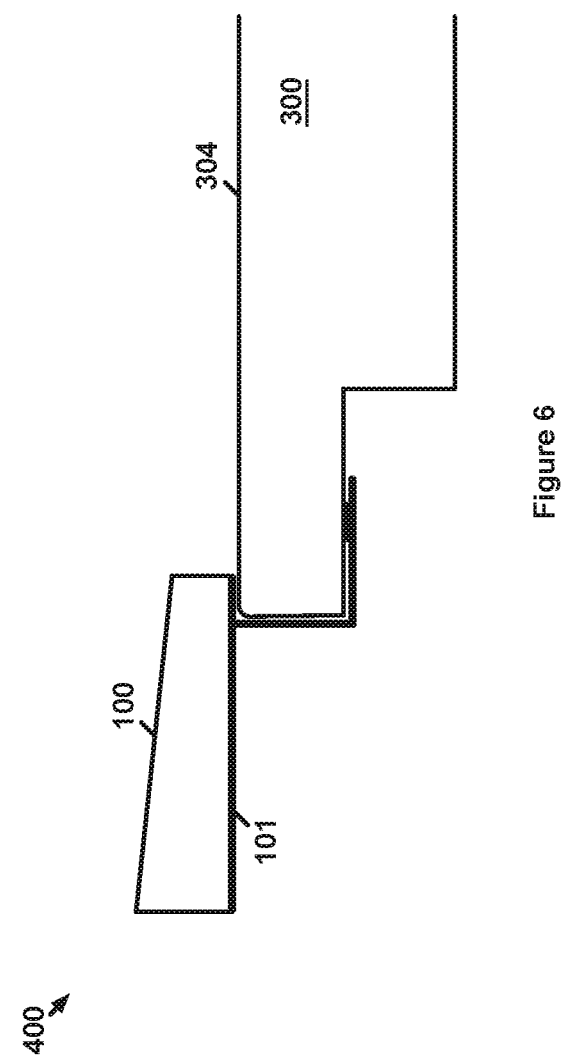
FIG. 6 illustrates a combined apparatus of a handset cradle attachment affixed to a telephone from a profile perspective.

FIG. 6 illustrates combined apparatus 400 of handset cradle attachment 100 affixed to telephone 300 from a profile perspective. In this example, it can be seen how protrusion 201 has disappeared into screw hole 501 and how perpendicular face 202, parallel face 203, and surface 205 all snuggly fit the shape of telephone 300 at the position where protrusion 201 fits into screw hole 501 and is aligned with handset cradle 301 as shown in FIG. 4. As previously noted, connector 104 of handset cradle attachment 100 may be shaped differently depending on the type of telephone to which handset cradle attachment 100 is intended to be attached. In this example, bottom face 101 is level with telephone surface 304. In other examples, bottom face 101 may be oriented at an angle relative to telephone surface 304. For instance, a downward angle of bottom face 101 relative to telephone surface 304 may enable gravity to assist placement of a telephone handset into handset cradle 301.

Given that handset cradle attachment 100 is not permanently attached to telephone 300, handset cradle attachment 100 can be removed whenever desired. For example, if telephone 300 is a leased phone or a phone currently assigned to a particular operator, the operator may remove handset cradle attachment 100 when telephone 300 is returned or reassigned.

Figure 7:
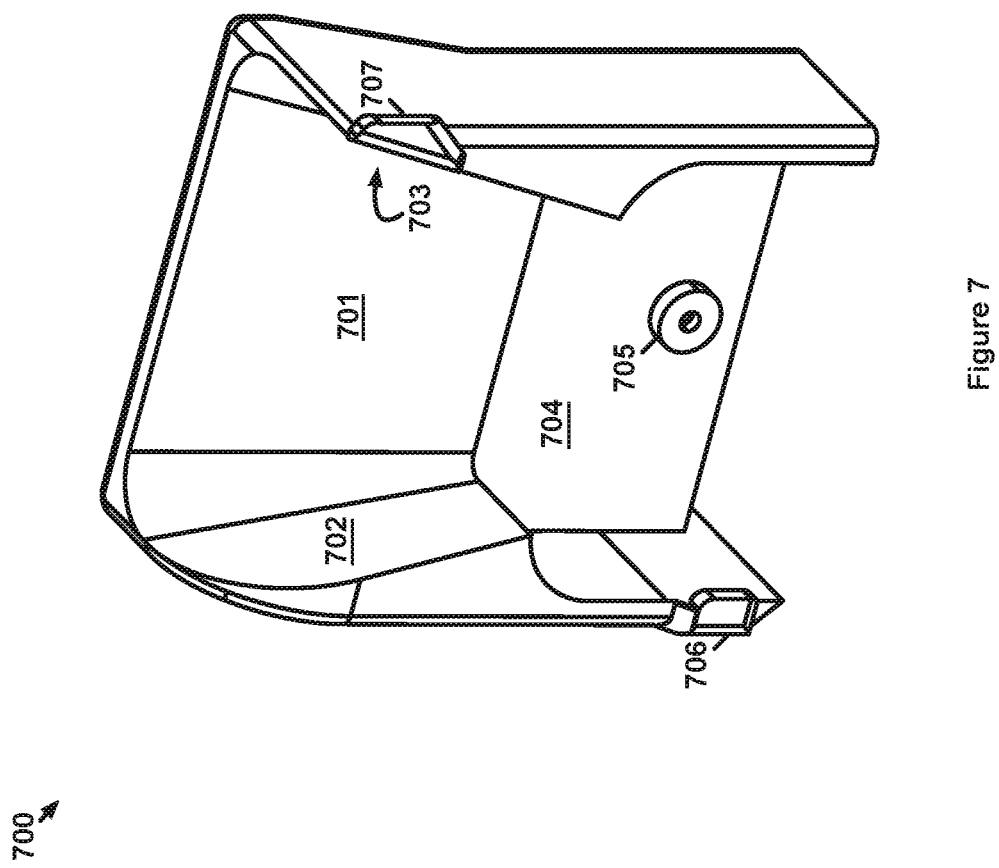
FIG. 7 illustrates a handset cradle attachment.

FIG. 7 illustrates handset cradle attachment 700. Handset cradle attachment 700 is an alternative example of handset cradle attachment 100. Like handset cradle attachment 100, handset cradle attachment 700 includes bottom face 701, sidewall 702, sidewall 703, and connector 704. Connector 704 is a surface that includes protrusion 705 with a hole that corresponds to a screw hole on a telephone of a type to which handset cradle attachment 700 is designed to attach. Sidewalls 702 and 703 curve to meet bottom face 701. In this example, sidewalls 702 and 703 do not stop where bottom face 701 ends. Rather, sidewalls 702 and 703 extend in a manner that conforms to the shape of a telephone of a type to which handset cradle attachment 700 is designed to attach. Sidewall 702 also includes tab 706 for clipping handset cradle attachment 700 to the telephone. Sidewall 703 similarly includes tab 707 for clipping handset cradle attachment 700 to the telephone. As such, tabs 706 and 707 used as connectors in conjunction with connector 704 may be sufficient to hold handset cradle attachment 700 on the telephone. A screw through protrusion 705 may be used to secure handset cradle attachment 700 thereto.

Figure 8:
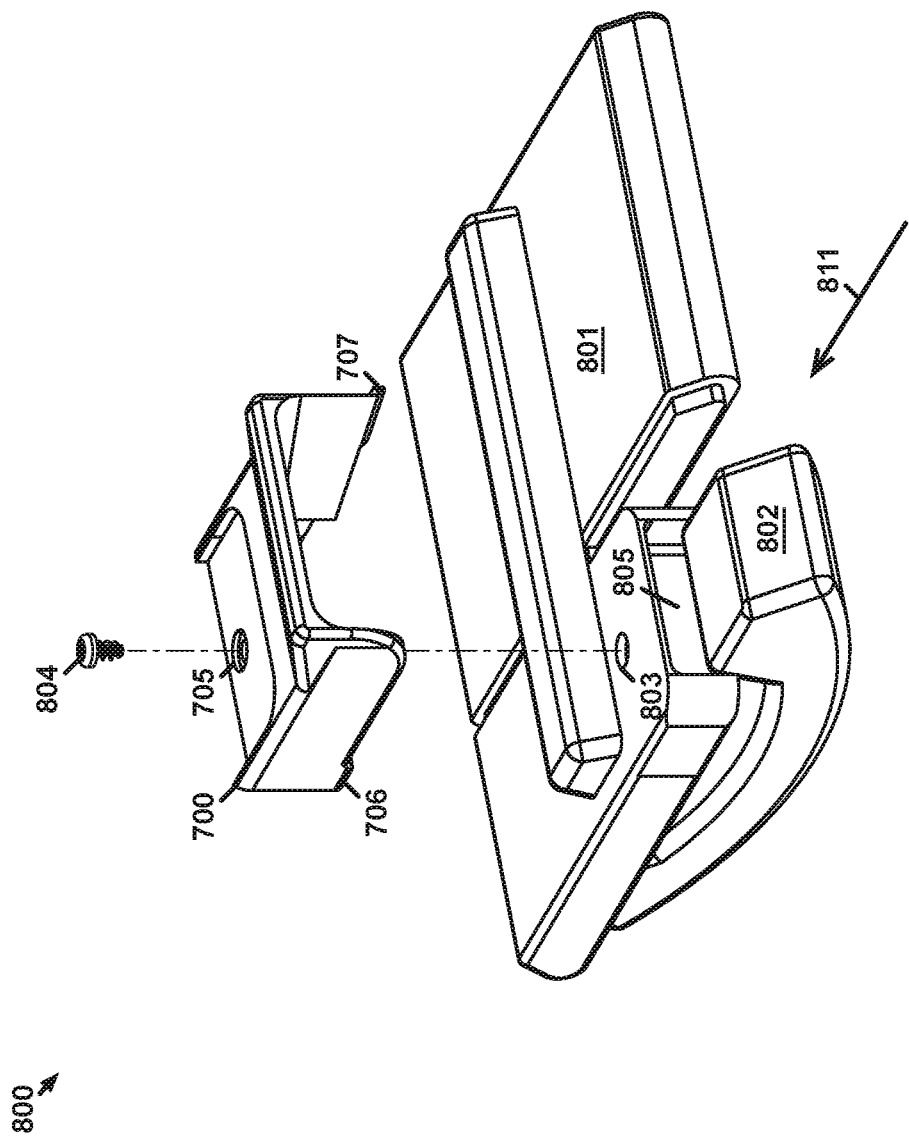
FIG. 8 illustrates a scenario for affixing a handset cradle attachment to a telephone.

FIG. 8 illustrates a scenario 800 for affixing a handset cradle attachment to a telephone. In scenario 800, telephone 801 is viewed from below and handset cradle attachment 700 is affixed to telephone 801 using screw 804. Screw 804 fits through protrusion 705 and into hole 803 in telephone 801. In this example, screw 804 fit into hole 803 even without handset cradle attachment 700 to help hold telephone 801 together. Screw 804 may simply be removed from hole 803 and then replaced once handset cradle attachment 700 is positioned with protrusion 705 in hole 803. Scenario 800 further shows telephone handset 802 on-hook in handset cradle 805. Unlike handset cradle 301, handset cradle 805 does not include cradle sidewalls fully surrounding a well. It should be understood that, while scenario 800 shows the order in which elements 700, 801, and 804 fit together once handset cradle attachment 700 is installed onto telephone 801, handset cradle attachment 700 may be positioned onto telephone 801 from a different direction than shown. For instance, if sidewall 702 cannot flex to allow tab 706 to clip onto the front face of telephone 801, then handset cradle attachment 700 may need to slide into place next to handset cradle 805 in the direction indicated by arrow 811 (with telephone handset 802 likely not on hook despite what scenario 800 shows).

Figure 9:
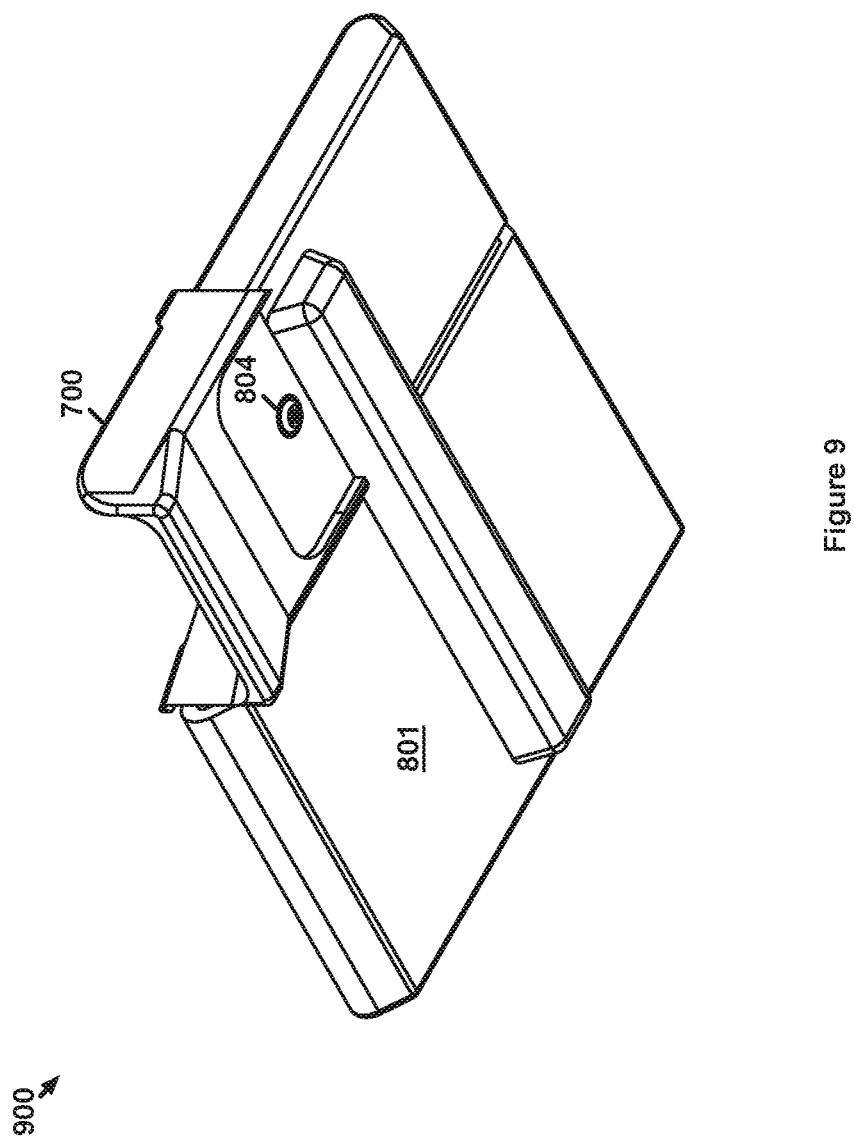
FIG. 9 illustrates a combined apparatus of a handset cradle attachment affixed to a telephone.
Figure 10:
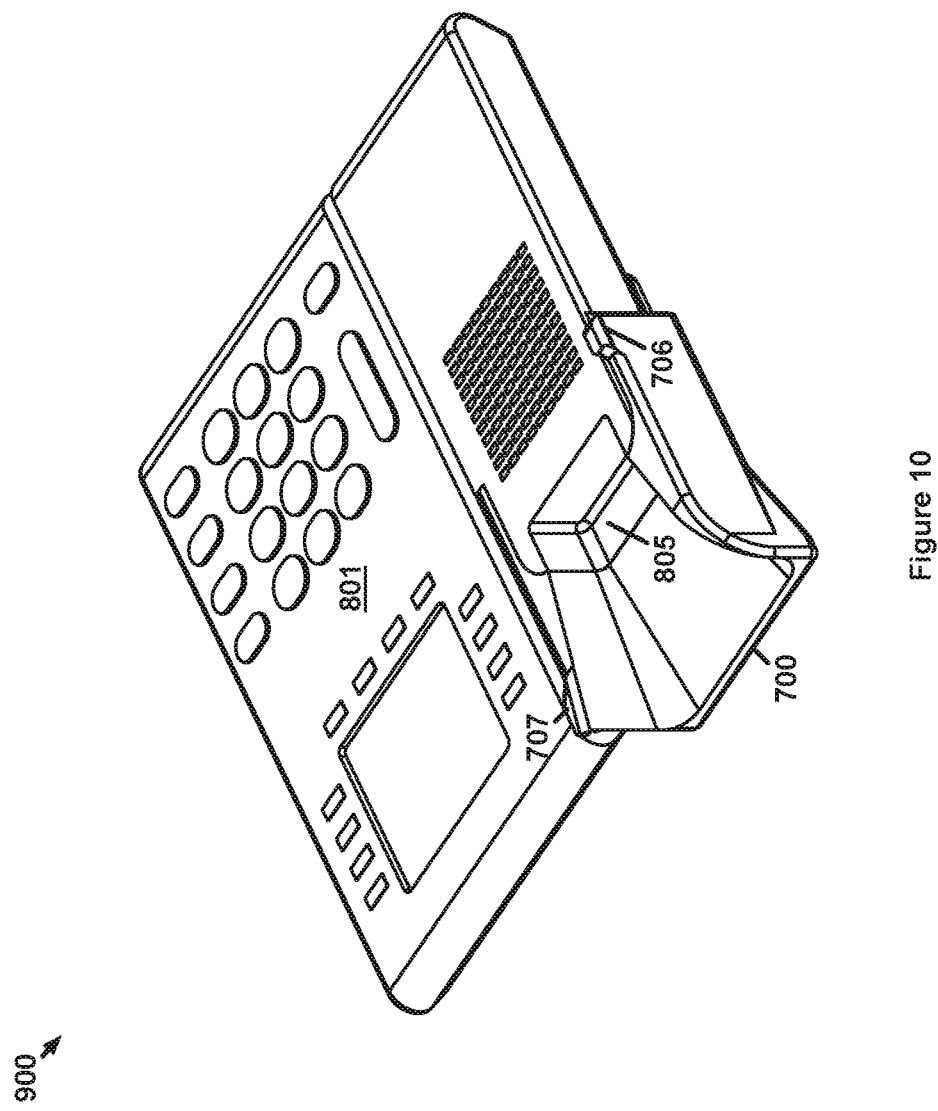
FIG. 10 illustrates a combined apparatus of a handset cradle attachment affixed to a telephone.
Figure 11:
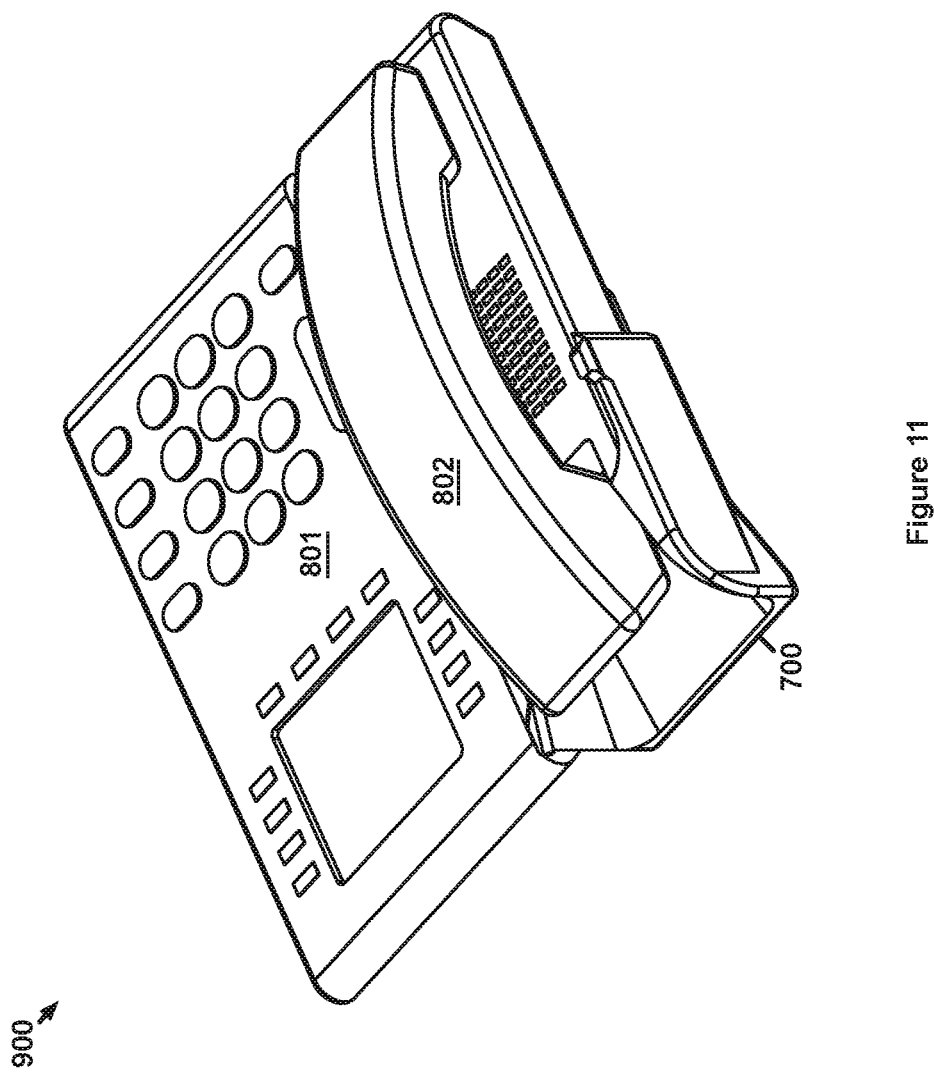
FIG. 11 illustrates a combined apparatus of a handset cradle attachment affixed to a telephone.

FIG. 9 illustrates combined apparatus 900 of handset cradle attachment 700 affixed to telephone 801 from the underside of telephone 801. Combined apparatus 900 represents handset cradle attachment 700, telephone 801, and screw 804 after scenario 800 occurs. FIG. 10 also illustrates combined apparatus 900 of handset cradle attachment 700 affixed to telephone 801 but from the top side of telephone 801. From the angle shown in FIG. 10, it can be seen how tabs 706 and 707 fit over the face of telephone 801 to affix handset cradle attachment 700 to telephone 801 in proper alignment with handset cradle 805 (i.e., such that telephone handset 802 can fall into handset cradle 805 with minimal or no hinderance, such as a misaligned seam). It can also be seen how sidewalls 702 and 703 conform to the shape of telephone 801 around handset cradle 805. Once affixed to telephone 801, handset cradle attachment 700 provides a much larger target area for capturing telephone handset 802. Handset cradle attachment 700 is also shaped to direct telephone handset 802 into an on-hook position in handset cradle 805. FIG. 11 illustrates combined apparatus 900 of handset cradle attachment 700 affixed to telephone 801 with telephone handset 802 in the aforementioned on-hook position.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. An apparatus comprising:
   a connector for affixing the apparatus to a telephone handset cradle;
   a bottom face; and
   a first sidewall and a second sidewall extending from the bottom face, wherein a distance between the first sidewall and the second sidewall tapers towards the cradle.

2. The apparatus of claim 1, wherein a height of the first sidewall and the second sidewall from the bottom face tapers towards the cradle.

3. The apparatus of claim 1, wherein the bottom face abuts an opening to the telephone handset cradle.

4. The apparatus of claim 1, wherein the bottom face gradually changes shape from substantially flat to match a shape of an opening to the telephone handset cradle.

5. The apparatus of claim 1, wherein the connector comprises a screw hole through which a screw attaches the apparatus to a telephone that includes the telephone handset cradle.

6. The apparatus of claim 5, wherein the telephone includes a preexisting hole into which the screw is positioned.

7. The apparatus of claim 1, wherein the connector comprises a clip formed by the first sidewall and the second sidewall.

8. The apparatus of claim 1, wherein the connector comprises a surface abutting a telephone that includes the telephone handset cradle, wherein adhesive applied to the surface affixes the surface to the telephone.

9. The apparatus of claim 1, further comprising:
a protrusion that fits into a portion of a telephone that includes the telephone handset cradle to maintain proper orientation of the apparatus relative to the telephone handset cradle.

10. The apparatus of claim 9, wherein the connector includes the protrusion.

11. A method comprising:
affixing an apparatus to a telephone that includes a telephone handset cradle, wherein the apparatus includes:
a connector for affixing the apparatus to a telephone handset cradle;
a bottom face; and
a first sidewall and a second sidewall extending from the bottom face, wherein a distance between the first sidewall and the second sidewall tapers towards the cradle.

12. The method of claim 11, wherein a height of the first sidewall and the second sidewall from the bottom face tapers towards the cradle.

13. The method of claim 11, wherein the bottom face abuts an opening to the telephone handset cradle.

14. The method of claim 11, wherein the bottom face gradually changes shape from substantially flat to match a shape of an opening to the telephone handset cradle.

15. The method of claim 11, wherein the connector comprises a screw hole, and wherein affixing the apparatus comprises:
positioning a screw through the connector into the telephone.

16. The method of claim 15, wherein the telephone includes a preexisting hole into which the screw is positioned.

17. The method of claim 11, wherein the connector comprises a clip formed by the first sidewall and the second sidewall, and wherein affixing the apparatus comprises:
clipping the apparatus to a receiving portion of the telephone.

18. The method of claim 11, wherein the connector comprises a surface abutting a telephone that includes the telephone handset cradle, and wherein affixing the apparatus comprises:
applying adhesive to the surface; and
pressing the surface to the telephone.

19. The method of claim 11, further comprising:
positioning a protrusion of the apparatus into a portion of telephone to maintain proper orientation of the apparatus relative to the telephone handset cradle.

20. The method of claim 19, wherein the connector includes the protrusion.

\* \* \* \* \*